Jan. 8, 1963 M. W. HINSHAW 3,072,470
METHOD OF MAKING A CUTTING APPARATUS
Filed Dec. 1, 1959
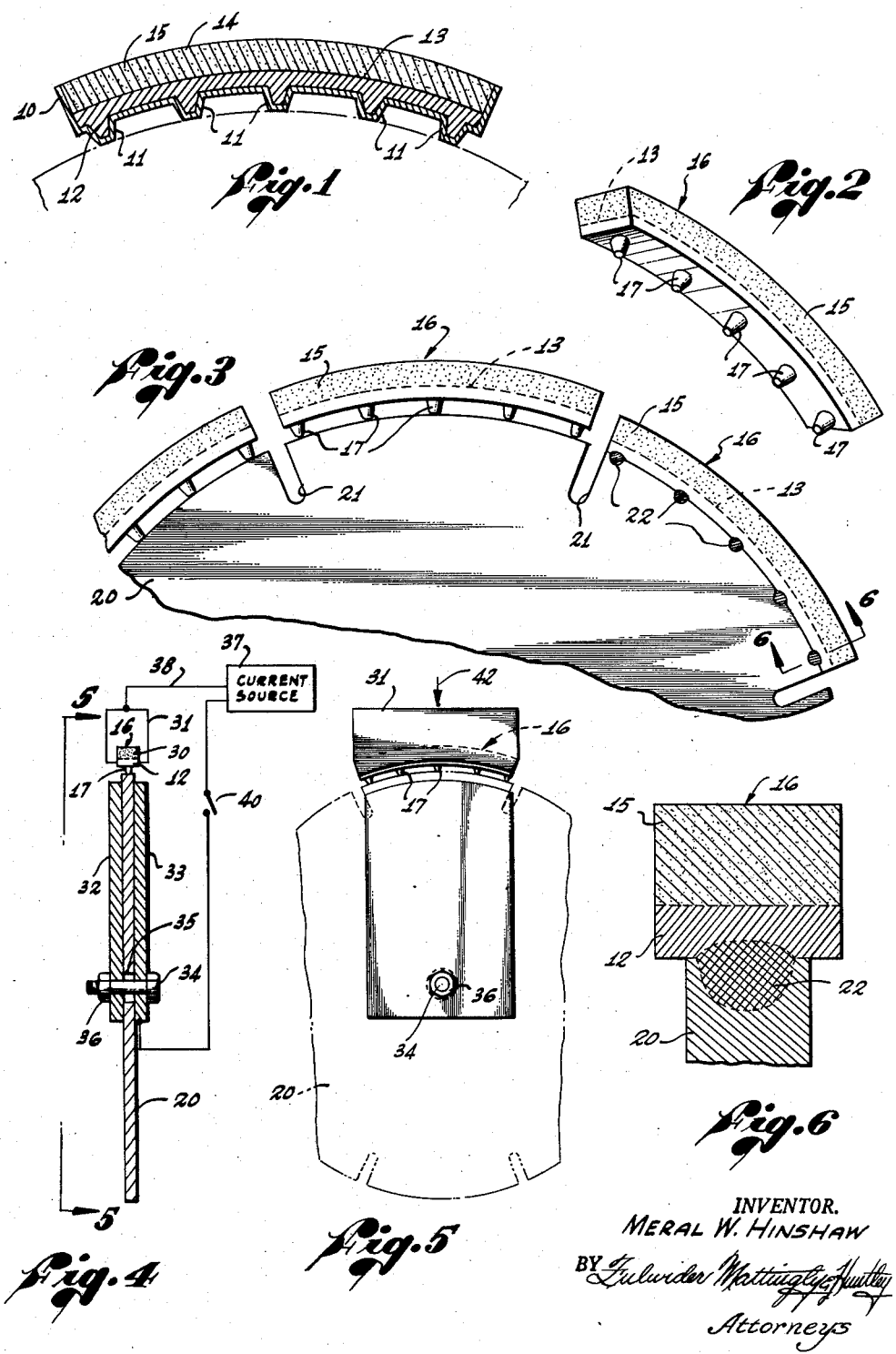
INVENTOR.
MERAL W. HINSHAW
BY
Attorneys

United States Patent Office 3,072,470
Patented Jan. 8, 1963

3,072,470
METHOD OF MAKING A CUTTING APPARATUS
Meral W. Hinshaw, Torrance, Calif., assignor to Diamond Tool Associates, Hawthorne, Calif., a partnership
Filed Dec. 1, 1959, Ser. No. 856,591
1 Claim. (Cl. 51—293)

This invention relates to circular cutting elements, and more particularly to an improved cutting saw of the type having spaced cutting heads secured to the peripheral edge of a disc core.

One type of cutting device to which the invention is directed is the so-called cutting saw for cutting concrete and the like. Typically, such a saw is formed with a disc of hardened steel that forms the core for the device. The disc is provided with a plurality of spaced radial slots extending from its peripheral edge, and arcuate cutting segments extending from slot to slot are secured to the periphery of the core.

The arcuate cutting segments are generally formed of a mixture of metal and diamond particles that are compressed together. The segments are wider than the core, whereby to form a kerf in a concrete article of a width equal to the axial thickness of the segments.

One of the greatest difficulties that has been encountered with cutting saws of the type above mentioned is that of the segments being sheared off the periphery of the core. As will be recognized, the segments are subjected to very great stresses that tend to shear them off the core. Thus, one of the most important steps in fabricating a core of this type is that of securing the segments to the core.

A variety of procedures have been adopted in the past for uniting the segments and the core of a cutting saw. A typical approach is to secure the segments in place by silver soldering, brazing and the like. However, regardless of the technique heretofore employed for accomplishing this purpose, the bond has been found to break down over a period of continued use, thereby permitting the segments to be sheared off the core.

One tell-tale sign that a bond does not make a segment truly integral with a core is the condition of the parts when the segment has been forcibly separated from the core. Uniformly, segments secured to a core by prior art techniques break cleanly, i.e., the break occurs at the junction of the core and the segment. Considerable effort and expense are directed to keeping customers supplied with saws in working condition, e.g., by providing new ones while re-bonding the sheared segments to their cores. As will be apparent, the saw manufacturers must bear the major burden of the costs in these instances.

It is an object of my invention to provide a unique cutting device that overcomes the above and other disadvantages of prior art cutting devices.

Another object of my invention is to provide a circular saw wherein separate core and cutting segments are joined so as to be truly integral.

It is a further object of this invention to provide a unique cutting segment that includes a method for securing it to the periphery of a core by projection welding, whereby to unite the segment and the core so that they are truly integral.

A still further object of my invention is to provide a method for uniting a cutting segment and a supporting core therefor in such a manner that tangential stresses tending to shear the segment from the core are transmitted into the body of the core directly.

It is also an object of my invention to provide an improved cutting saw construction which comprises a minimum number of component parts of simple design and rugged construction.

The above and other objects and advantages of my invention will become apparent from the following description taken in conjunction with the accompanying drawings of an illustrative embodiment thereof, in which:

FIGURE 1 is a longuitudinal sectional view of an arcuate mold having depressions in its lower surface, showing how the lower portion of the mold is filled with a conductive metal powder;

FIGURE 2 is a perspective view of a cutting segment formed in the mold of FIGURE 1, showing the projections on the bottom surface thereof;

FIGURE 3 is a fragmentary side elevation view of a slotted core element wherein the cutting segments are secured to its periphery by projection welding, showing one cutting segment in position with the projections in abutment with the periphery of the core, and showing another cutting segment abutting the periphery of the core after the projections have been fused with the metal of the core;

FIGURE 4 is an end elevation view of the core with a cutting segment positioned with its projections against the periphery thereof, and showing the cutting segment and the core clamped in respective electrodes that are coupled to a current source;

FIGURE 5 is a fragmentary side elevation view taken along the line 5—5 of FIGURE 4; and FIGURE 6 is a fragmentary sectional view taken along the line 6—6 of FIGURE 3, showing how the metals of the cutting segment and the core are caused to flow together so as to lock them together in a manner to prevent the segment from being sheared cleanly off the core.

Referring to FIGURE 1, there is shown an elongated, arcuate hollow mold 10 having depressions 11 in its lower surface. A layer of finely divided powder of highly conductive metal, indicated at 12, is poured into the bottom of the mold to a level 13 above the depressions 11. The mold 10 is then filled to a level 14 with a layer 15 formed of a mixture of metal and diamond particles, e.g. 80% hardened steel particles and 20% diamond particles. Since the layers 12 and 15 are in powder form, the levels 13, 14 can readily be curved along lines concentric with the periphery of an element that forms the core of a cutting saw.

After the layers 12, 15 of powders are formed in the mold 10 as above described, the mold is placed in an oven (not shown) in which the powders are compressed so as to effect their fusion into a solid element 16 (see FIGURE 2). As shown in FIGURE 2, the element 16 is one in which the lower surface has a plurality of projections 17, such projections being the portions of the metal in the lower layer 12 that filled the depressions 11 in the mold 10.

Referring to FIGURE 3, there is shown a portion of a hardened steel core 20 of the type having spaced radial slots extending from the periphery thereof. A segment 16 to be secured to the periphery of the core is located intermediate adjacent slots, with the projections 17 abutting the peripheral edge of the core 20. Thereafter, welding current is passed through the projections, thereby to cause the fusion of the metals of the layer 12 and the core 20.

By forcing the segment 16 inwardly while the welding current passes through the projections 17, the fusion of the projections 17 permits the segment to move against the periphery of the core 20. Such fusion results in spaced welds 22 which extend into both the core 20 and the lower portion of the segment 16.

FIGURES 4 and 5 illustrate means for effecting the above-described projection welding. The segment 16 is snugly fitted in a groove 30 formed in one face of a bar 31 of conductive material, e.g. copper. The depth of the groove 30 is such that when the segment 16 is seated therein, the ends of the side walls of the groove are in contact with the layer 12 of the segment 16. As shown, the bar 31 is positioned so that the projections 17 are in abutment with the periphery of the core 20.

Means are mounted on the core 20 for the purpose of carrying out the projection welding. Such means comprises a pair of bars 32, 33 of conductive material, such as the material of which the bar 31 is formed. The bars 32, 33 at one end are located adjacent the periphery of the core 20 past the center of the core. The bars 32, 33 are clamped to the core 20, as by a threaded bolt 34 passed through the center opening 35 and the core, and a nut 36 is threaded on to the bolt 34 until the conductive bars 32, 33 firmly clamp the core 20 therebetween.

A current source 37 is connected at 38 to the bar 31, and at 39 through a switch 40 to one of the bars 32, 33. Upon closing the switch 40, a complete conductive path is provided through the bar 31, the projections 17, the core 20 and the bars 32, 33.

Preparatory to closing the switch 40 and causing welding current to pass through the projections 17, a force is applied to the bar 31 as indicated at 42 in FIGURE 5, to urge the bar 31 toward the center of the core 20. Thus, when the switch 40 is closed to cause welding current to pass through the projections 17, the metals of the projections 17 and the adjacent points of the periphery of the core 20 fuse together, and the bar 31 moves inwardly to cause the lower surface of the layer 12 of the segement 16 to come to rest on the periphery of the core 20.

The structure of my invention insures that the projections 17 are fused simultaneously, and that the welds 22 are of substantially the same size. To insure this result, the projections 17 are made of the same dimensions. Since the layer 12 of the segment 16 is directly engaged by the bar 31, it will be seen that substantially equal current paths are provided through the projections 17. Accordingly, the current density through the projections 17 is initially the same, so that all of the projections start to flow substantially simultaneously.

Since the force applied to the bar 31 is distributed to all of the projections 17, the various parts of my system cooperate to effect inward movement of all portions of the segment 16 at the same rate. Therefore, it will be seen that all of the projections 17 result in effective welds 22, each of which constitutes a small section of metal formed of both the metal of the core 20 and the metal of the lower layer 12 of the segment 16. Each of the welds 22, therefore, constitutes means for interlocking the segment 16 and the core 20.

When a cutting saw formed in accordance with my invention is used to cut a kerf in concrete, the forces tending to shear the segment off the core cannot effect severance of the segment from the core without taking a portion of the core with it. This means, of course, that my method of securing cutting segments to a core eliminates the possibility of the bond between the segment and the core being loosened by repeated vibrations over a long period of use.

One of the most important advantages of my invention is that, unlike prior art saws, the segments cannot be loosened due to excessive heat. Reference here is had to the normal operation of concrete cutting saws, in which it it is necessary to continuously spray water on the saw for cooling purposes. As is well known, even a momentary shutting off of the spray results in considerable heat being generated, due to friction of the revolving saw against the concrete. Such heat is high enough to melt the metal forming the bond of prior art saws, and permits the segments to loosen and come off the core. But in my invention, since the bond comprises the metals of the segments and the core, such heating as normally occurs in this fashion is insufficient to heat these parts to their melting points.

While I have described and illustrated a particular embodiment of my invention, it will be readily apparent that various modifications can be made therein without departing from the spirit and scope of my invention. For example, the powder deposited in the depressions 11 of the mold 10 may comprise particles of metal differing from the remainder of the powders used in forming this segment. If desired, the mold 10 need not be provided with depressions 11, i.e. the projections 17 do not have to be formed integral with the segment 16, but may be separate elements secured to the lower surface of the segement. Another modification may be the forming of the entire segment including the projections, of a powder formed by mixing metal and diamond particles; in such case, it is apparent that the conductivity is not as good as in the case where the lower layer 12 and the projections 17 are formed of conductive metal powders alone, but still is one that is satisfactorily conductive to form the interlocking welds.

My invention is also not limited to forming spaced welds. The same process is applicable to forming a fusion of the metals of a segment and a core all along their abutting surfaces. To this end, I selectively heat the projections, in the position of the segment shown in FIGURES 4 and 5, for a sufficient length of time to heat the entire peripheral surface of the core 20 to the fusion level, as well as the metal of the layer 12. Such heating occurs as a result of the heat conduction characteristics of the materials of these elements. Then the segment is forced toward the core, whereupon to effect a continuous weld all along their abutting portions.

It will be apparent that my invention embraces the above and other modifications. Accordingly, I do not intend that my invention be limited, except as by the appended claim.

I claim:

The method of forming a cutting segment and uniting the same with the conductive disc core of a circular saw comprising the steps of: forming an arcuate hollow mold with depressions in the lower surface of said mold; pouring an arcuate layer of conductive metal into the bottom of said mold to form an arcuate layer having conductive projections on its concave surface; pouring a layer of mixed abrasive and metal particles on the convex surface of said conductive layer; curing said layers by heat and pressure to form a single cutting element; removing said cutting element from said mold; positioning said cutting element with said conductive projections abutting the peripheral edge of the conductive core; simultaneously passing an electrical current of uniform density through all of said conductive projections and said conductive core to coalesce the materials of said projections and said core; and applying a force to said cutting element to hold it against said core while said materials are coalescing, whereby the conductive layer of said cutting element is seated against said core by means of a bond which renders said cutting element and said core structurally inseparable without irreparable damage to both said core and said cutting element.

References Cited in the file of this patent
UNITED STATES PATENTS

| | | |
|---|---|---|
| 1,521,857 | Blum | Jan. 6, 1925 |
| 2,584,189 | Dalin | Feb. 5, 1952 |
| 2,796,706 | Anderson | June 25, 1957 |
| 2,798,474 | Ballhausen | July 9, 1957 |

OTHER REFERENCES

"Welding Designs Handbook," 1948, pages 40 and 41, McGraw-Hill & Co. (Copy in Scientific Library.)

Gill et al.: "Modern Welding Technique," 1950, pages 39 to 42, Sir Isaac Pittman & Sons Ltd., London. (Copy in Scientific Library.)